May 22, 1956  R. MARTINES  2,747,171
MEANS FOR CONNECTING A MEMBER TO AN ELECTRICAL WIRE
Filed May 6, 1952  2 Sheets-Sheet 2
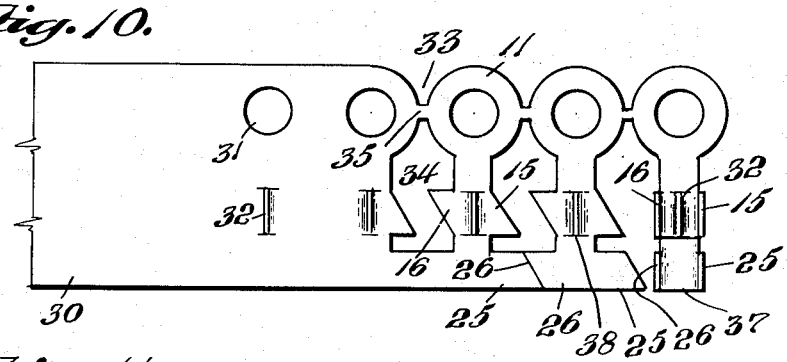
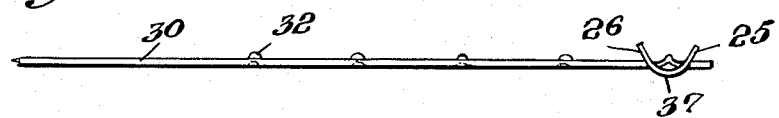
INVENTOR.
Rene Martines
BY
Barlow & Barlow
ATTORNEYS.

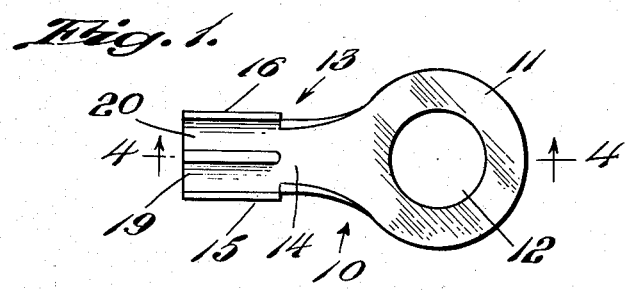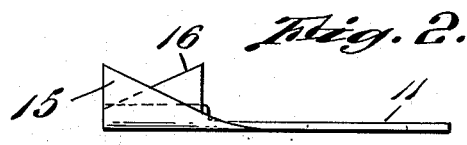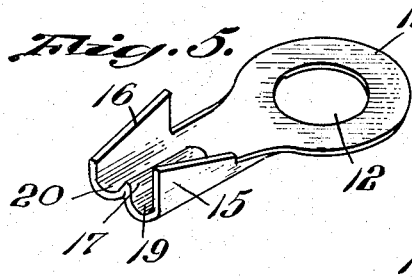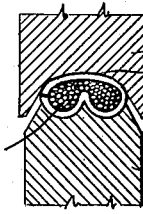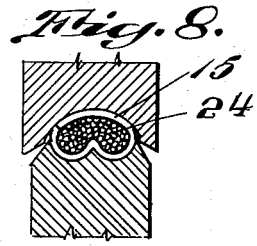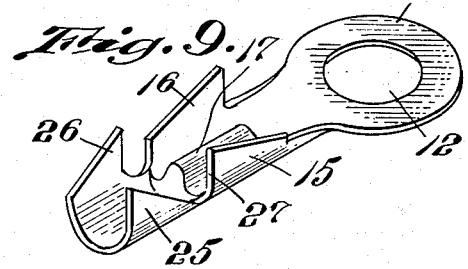

United States Patent Office 2,747,171
Patented May 22, 1956

2,747,171
MEANS FOR CONNECTING A MEMBER TO AN ELECTRICAL WIRE

Rene Martines, Warwick, R. I., assignor to The Crimpweld Corporation, a corporation of Rhode Island Application May 6, 1952, Serial No. 286,298

3 Claims. (Cl. 339—276)

This invention relates to a means for connecting a wire to a terminal or wire connector.

Heretofore a wire was connected to a terminal or some connector by use of ears which were rolled hard around the wire by rolling tools. The inherent resiliency of the ears and portions rolled about the wire was such that the metal would spring away from the wire a little unless the metal was rolled a sufficient distance around the wire so that there would be enough friction to prevent this, which was unusual. In some cases there has been an upsetting of a cylinder which would press against the wire when inserted into the end of the cylindrical device to hold the wire therein. In some other cases there was such a rolling of the parts into the wire that the wire would become abraded or cut in such a way as to reduce the strength of the wire itself; thus the pull test would cause the wire to break and the attached device to come free of the wire.

The principal object of this invention is to produce holding power between members with relatively thin metal ears, whereas previously much thicker metal, and therefore a much more expensive metal, was used. All that the thicker metal did or does it to hold the wire for proper pull-test. Its electrical conductivity is far beyond that which is necessary. Therefore, electrically speaking, the thin metal is more than sufficient.

Another object is to accomplish the above principal object without cutting strands of wire by rolling sharp ears into the wires or pinching them into confinement to the point of abrading them.

Another object of this invention is to provide a better holding with the same thickness of metal between the shank portion and the wire to which it is attached so that upon a pull test the parts will remain assembled.

Another object is to get exacting standards as to holding power by establishing predetermined proportions in the terminal itself, and not make these proportions depend on the rolling or crimping operation at random.

Another object is to eliminate solder and retain consistent holding power and identical connection without cutting wire.

Another object of this invention is to provide a connecting means which will not cut through or abrade the wire and thus reduce its tensile strength.

Another object of this invention is to provide a terminal having a pair of arcuate portions which will remain of substantially the same size or diameter after the wire is rolled into these portions.

More specifically an object of this invention is to provide the shank which is to receive the wire with a predetermined pair of arcuate portions which maintain this portion of the shank in fixed shape, while the ears which are bent round the wire are themselves alone deflected or bent, thus placing a stress in a minor portion of the shank.

With these and other objects in view, the invention consists of certain novel features of construction as will be more fully described and particularly pointed out in the appended claims.

In the accompanying drawings:

Figure 1 is a top plan view of a terminal, the shank of which is constructed in accordance with this invention;
Figure 2 is a side elevation thereof;
Figure 3 is an end view thereof;
Figure 4 is a section on line 4—4 of Figure 1;
Figure 5 is a perspective view of the terminal;
Figure 6 is a sectional view showing the terminal as placed in a rolling tool with the wire in place and with the jaws of the tool open;
Figure 7 is a view similar to Figure 6 but showing the jaws closed and the ears of the terminal rolled into binding relation with the wire;
Figure 8 is a view similar to Figure 7 but showing the wire of greater diameter gripped by the same size terminal connecting means;
Figure 9 is a perspective view of a terminal of modified form showing ears for gripping insulation on the wire;
Figure 10 is a plan view of a strip of sheet stock showing different steps in the formation of the terminal;
Figure 11 is an edge view of Figure 10.

In proceeding with this invention, I have disclosed a terminal having a lug type means for attaching it into position wtih a shank which extends therefrom for connection to the wire. Invention in this case relates to the shank or means by which the terminal is connected to the wire rather than to the lug or circular portion which may be changed at will, or in fact the device may include a connector where both ends are similar to the connector shown on the shank of the terminal herein disclosed. Likewise, there may be other forms of connecting means or insulation on the wire to be attached as will hereinafter appear.

With reference to the drawings, 10 designates generally a terminal having a circular head 11 with an opening 12 therein for attachment in position. The shank 13 of this terminal comprises a back wall or central portion 14 with wire binding ears 15 and 16 at either side of the back wall and extending upwardly therefrom. The back wall 14 is deflected to provide a projection 17 midway between the ears 15 and 16 by forcing the stock upwardly between the ears and leaving a recess 18 on the outside of the back wall. These curves are formed or struck in manufacture so as to harden the metal by slightly compressing same giving a much greater strength. This provides two similar arcuate portions 19 and 20 emanating from an apex 17, which are substantially semi-cylindrical and divide the generally U-shaped receptacle formed between the back wall and the ears into two portions.

A solid or stranded wire may be attached to this connecting means of the terminal by laying the wire 21 (see Fig. 6) so that portions of it may flow or be cold pressed in both of the arcuate portions 19 and 20 of the receptacle with the back wall supported by a jaw 22 of a tool, while the upper jaw 23 of the tool is provided with a rolling portion 24 which will engage the ears 15 and 16, and by closing the jaws into the position shown in Fig. 7, the ears 15 and 16 will be rolled snugly about the wire, forcing the wire into the arcuate portions of the receptacle and causing the arms to lie along the portion of an ellipse about the wire 21. In some cases where there is a stranded wire of larger diameter as indicated at 25, Fig. 8, the roll of the ears 15 and 16 will take an arc of a shorter radius as there shown. Said two curves are not changed or altered in the subsequent rolling action of wire attachments. The wires need not have the same diameters to accomplish the result herein described.

In some cases it is desired to provide ears such as 25 and 26 in Fig. 9 at a location beyond the ears 15 and 16, which ears 25 and 26 are used for rolling about insulation on the wire, which insulation would terminate at substantially the end 27 of the ears 15 and 16.

It will be readily understood that I may duplicate the structure of the back wall and ears at opposite ends of a connector so that the ends of two wires may be connected in this fashion.

In Figure 10 I have illustrated a strip of sheet stock from which the terminals are formed and designate this strip 30. This strip will pass through a machine in which different operations are performed upon the strip. In the first operation a hole 31 will be pierced in the strip and at the same time a projection 32 will be raised in the strip deflecting the stock thereof upwardly as viewed in Figures 10 and 11. In the next operation there will be cut from the strip portions at 33 and 34 leaving a connecting part 35 between two connector portions 11 as previously described and also leaving ears 15 and 16 and ears 25 and 26 with a severing line 36 between ears 25 and 26. In the next operation the ears 15 and 16 and 25 and 26 will be bent into substantially right angular relation with the strip 30 and at the same time a pair of dies will depress the stock 37 between the ears 25 and 26 so that it will be below the plane of the strip as heretofore formed. At the time of depressing this stock 37, this will be depressed along a slit 38 formed at the end of the projection 32 above mentioned.

I claim:

1. A wire terminal for a single conductor cable comprising a single metallic member having a connector portion and a shank portion, said shank portion of generally U-shape, the upstanding legs thereof forming upstanding right triangles, the central portion of said U-shaped shank portion having an inwardly extending longitudinal projection of uniform height and rounded cross section, said projection having a length substantially the width of said legs, said upstanding legs complementing each other when wrapped around a conductor in said shank portion to completely encircle a conductor and firmly press said conductor into said projection.

2. A wire terminal as in claim 1 wherein the projection comprises hardened metallic material, said upstanding legs being composed of soft metallic material.

3. A terminal connector in combination with a multi-strand conductor comprising a single metallic member having a connector portion and a shank portion, said shank portion having a centrally disposed inwardly extending longitudinal projection of uniform height and rounded cross section, a portion of said conductor lying on either side and above said projection, ears of right triangular form having a width substantially the length of said projection, said ears extending laterally from both sides of said projection and completely around said conductor to complement each other and force the individual strands of said conductor into a tightly bonded mass.

References Cited in the file of this patent

UNITED STATES PATENTS

| | | |
|---|---|---|
| 745,036 | Brooks | Nov. 24, 1903 |
| 1,654,340 | McIntosh | Dec. 27, 1927 |
| 1,789,951 | Terrell | Jan. 20, 1931 |
| 1,830,084 | Bjorndal | Nov. 3, 1931 |
| 1,989,718 | Taylor | Feb. 5, 1935 |
| 2,199,892 | Metcalf | May 7, 1940 |
| 2,314,884 | Klein | Mar. 30, 1943 |
| 2,347,713 | Rogoff | May 2, 1944 |
| 2,483,424 | Martines | Oct. 4, 1949 |
| 2,586,471 | Matthysse | Feb. 19, 1952 |
| 2,680,235 | Pierce | June 1, 1954 |

FOREIGN PATENTS

| | | |
|---|---|---|
| 531,246 | France | Jan. 9, 1922 |
| 662,273 | Great Britain | Dec. 5, 1951 |
| 884,641 | France | Aug. 23, 1943 |